United States Patent [19]

Kortmann

[11] Patent Number: 4,724,086
[45] Date of Patent: Feb. 9, 1988

[54] APPARATUS AND METHOD FOR CONDITIONING STRATIFIED WATER BODIES

[76] Inventor: Robert W. Kortmann, 430 Talcott Hill Rd., Coventry, Conn. 06238

[21] Appl. No.: 848,027

[22] Filed: Apr. 3, 1986

[51] Int. Cl.$^4$ .............................................. B01D 7/00
[52] U.S. Cl. .................................. 210/747; 210/758; 210/170; 210/199; 210/242.2; 261/77; 261/124
[58] Field of Search ............. 210/747, 758, 170, 194, 210/199, 242.2, 220; 261/77, 120, 124

[56] References Cited

U.S. PATENT DOCUMENTS

| | | | |
|---|---|---|---|
| 3,794,303 | 2/1974 | Hirschon | 261/61 |
| 3,840,216 | 10/1974 | Smith et al. | 210/242.2 X |
| 3,887,660 | 6/1975 | Romantschuk et al. | 210/242.2 X |
| 3,956,124 | 5/1976 | Fast et al. | 210/170 X |
| 4,044,720 | 8/1977 | Fast | 119/3 |
| 4,060,574 | 11/1977 | Verner et al. | 261/77 |
| 4,107,240 | 8/1978 | Verner et al. | 210/242.2 X |
| 4,210,613 | 7/1980 | Webb | 210/242.2 X |

*Primary Examiner*—Tom Wyse
*Attorney, Agent, or Firm*—Chilton, Alix & Van Kirk

[57] ABSTRACT

An apparatus for conditioning stratified water bodies having epilimnion, metalimnion and hypolimnion layers is disclosed comprising a reservoir for containing water so as to define a gas-liquid interface, at least one upwelling conduit adapted for generally vertical disposition within the water body and having an upper discharge end fluidly connected to the reservoir and a plurality of intake ports longitudinally spaced along the conduit so as to afford fluid communication with predetermined depth levels of the epilimnion, metalimnion, and hypolimnion layers of the water body, flow controllers for selectively alternately opening and closing off the intake ports of the upwelling conduit, at least one return conduit adapted for generally vertical disposition within the water body and having an upper inlet end fluidly connected to the reservoir and a plurality of discharge ports longitudinally spaced along the return conduit so as to afford fluid communication with predetermined depth levels of the epilimnion, metalimnion, and hypolimnion layers of the water body, flow controllers for selectively alternately opening and closing off the discharge ports, and a pump assembly for moving water from the water body through the open inlet ports, through the upwelling conduit to the reservoir, through the return conduit and out the open discharge ports of the return conduit. A method for manipulating the thermal/density structure and oxygen content of a body of water having epilimnion, metalimnion and hypolimnion layers with a water circulating apparatus having upwelling and return conduits extending through the layers is also disclosed comprising the steps of selectively drawing water from at least one of any of the layers through the upwelling conduits and forming at least one new induced isotherm at a selected depth within the layers by controllably injecting the drawn water from the return conduit into the water body at the selected depth to form a barrier to upward diffusive transport of nutrients.

25 Claims, 6 Drawing Figures

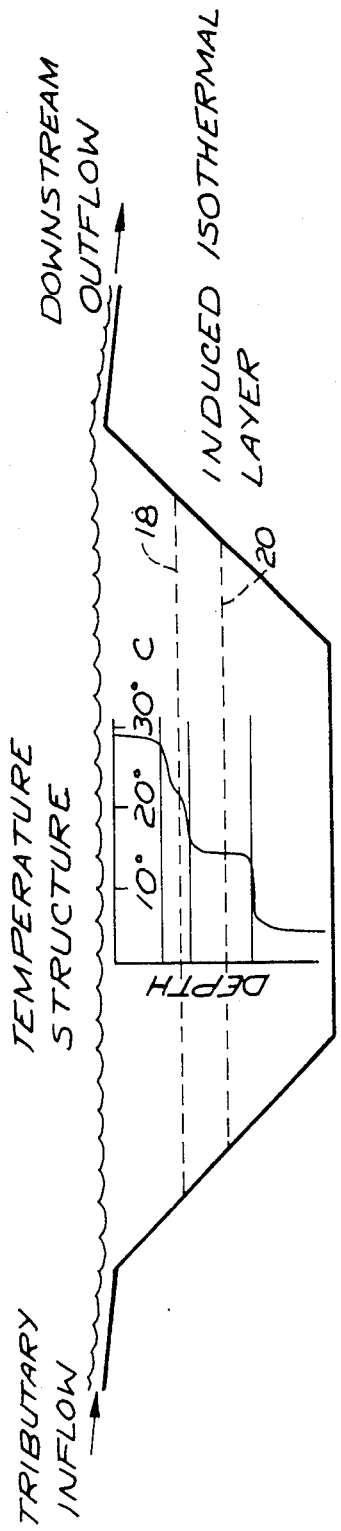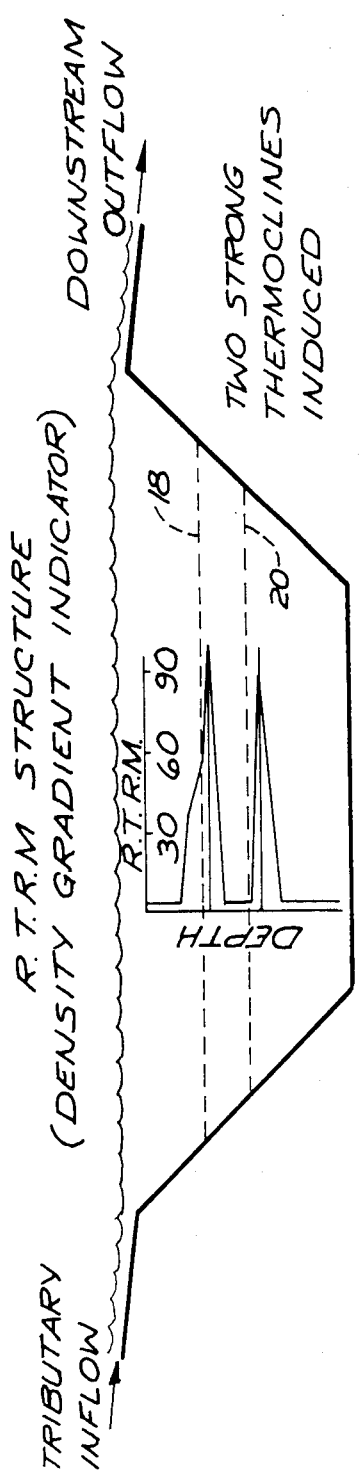

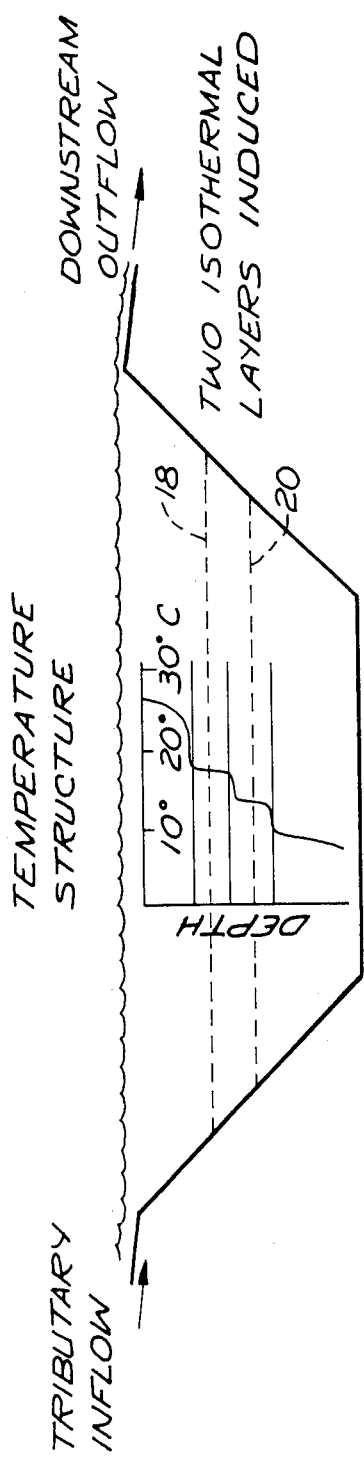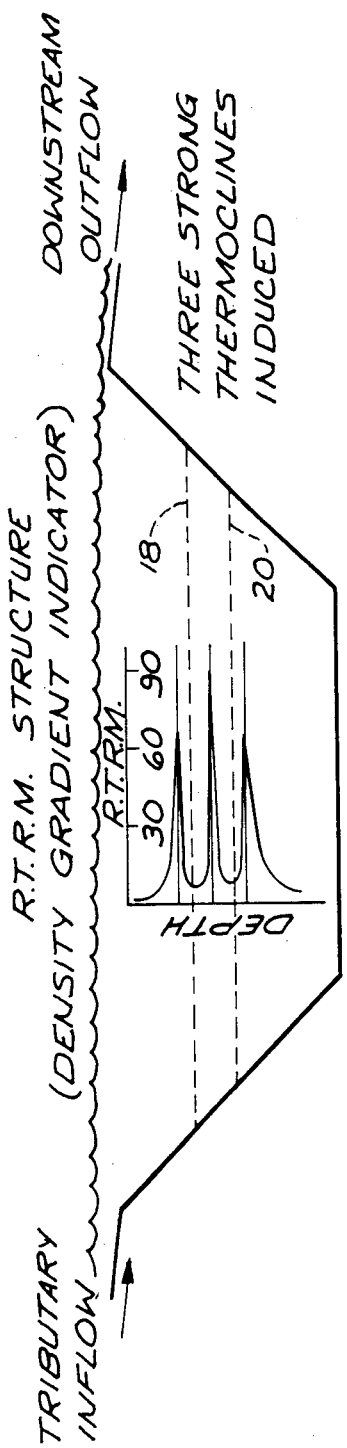

APPARATUS AND METHOD FOR CONDITIONING STRATIFIED WATER BODIES

BACKGROUND AND SUMMARY OF THE INVENTION

This invention relates to the conditioning of water bodies such as lakes, reservoirs and ponds and more particularly relates to the conditioning of such water bodies by manipulation of the thermal/density structure and oxygen content thereof.

Deep water bodies typically develop three characteristic layers due to the absorption of heat and the resulting differences in temperature and density from the surface downward. The upper or surface layer is a relatively warm mixed layer referred to as the "epilimnion". The epilimnion is the layer in which algal and weed growth becomes a problem in lakes and reservoirs. The metalimnion layer is located below the epilimnion and is characterized by rapid decreases in temperature and increases in density with depth. The temperature change in the metalimnion layer is generally greater than one degree centigrade per one meter depth increment. The depth within the metalimnion where temperature and density change is greatest per depth increment is called the "thermocline". Below the metalimnion is the uniformly cold layer called the "hypolimnion".

Being at the surface of the water body, the epilimnion layer has contact with the atmosphere and the attendant atmospheric gas exchange causes the warmer epilimnion layer to absorb oxygen. The lower layers are however isolated from the atmospheric gas exchange by the thermal/density stratification of the water body. Because of this thermal/density isolation from atmospheric gas exchange and both aerobic and anaerobic decomposition, the hypolimnion, metalimnion, and occasionally the lower epilimnion become devoid of oxygen and accumulate high concentrations of nutrients (i.e., nitrogen and phosphorus), carbon dioxide, and chemically reduced compounds such as manganese, iron, and sulfide. This accumulation often results in water quality problems for recreational use, water supply use, and aquatic habitat.

Accordingly, it is an object of the present invention to provide a new and improved apparatus and method for conditioning water bodies to alleviate water quality problems caused by deleterious accumulations of the type mentioned hereinbefore.

Another object of the invention is to provide a new and improved apparatus and method for manipulating or altering the thermal structure and metabolic/oxygen status of a water body to maintain or improve water quality.

A further object of the invention is to provide an apparatus and method for altering the thermal structure of a water body by creating or inducing new oxygenated, isothermal layers at various preselected depths in the water body.

A still further object of the invention is to provide an apparatus and method for redistributing oxygen available in a water body and introducing additional oxygen to one or more induced isothermal layers.

A still further object of the invention is to provide an apparatus and method for mixing water from different thermal layers in the water body and creating an oxygenated isothermal layer which will induce beneficial chemical reactions such as the precipitation of phosphorus and particulate matter.

Yet another object of the present invention is to provide an apparatus and method for creating multiple depths of steep temperature and density gradients ("thermoclines") to act as barriers to upward diffusive transport of nutrients and other bottom generated constituents such as iron, manganese, carbon dioxide, hydrogen sulfide and dissolved organic compounds.

Still another object of the invention is to provide an apparatus and method for aerating and circulating a selected depth interval of a water body.

Other objects will be in part obvious and in part pointed out more in detail hereinafter.

It has been found that the foregoing and related objects and advantages are attained in an apparatus for conditioning stratified water bodies comprising a reservoir and at least one upwelling and one return conduit adapted for generally vertical disposition within the water body and having an upper end fluidly connected to the reservoir. Each conduit has a plurality of ports longitudinally spaced along the conduit for fluidly connecting the conduit to the water body. These ports are spaced so as to afford fluid communication with predetermined depth levels of the epilimnion, metalimnion, and hypolimnion layers of the water body. Flow control assemblies are provided at each port for selectively alternately opening and closing off the ports to permit selective fluid communication with the predetermined depth levels. A pumping apparatus is connected to the upwelling conduit for moving water from the water body through the selected open inlet ports of the upwelling conduit through the upwelling conduit to the reservoir and through the return conduit from the reservoir for discharge out of the selected open discharge ports of the return conduit into the water body. In a specific embodiment of the invention, the reservoir is submerged below the surface of the water body and has an upper wall forming an interior gas chamber so as to define a gas-liquid interface within the chamber when submerged within a water body.

The new and improved method of the present invention for manipulating the thermal/density structure and oxygen content of a water body with a water circulating apparatus having upwelling and return conduits extending through the epilimnion, metalimnion and hypolimnion layers comprises selectively drawing water from at least one of any of said layers through the upwelling conduit. At least one new inducted isotherm is formed at a selected depth within the layers by controllably injecting the drawn water from the return conduit into the water body at the selected depth to form a barrier to upward diffusive transport of nutrients.

BRIEF DESCRIPTION OF THE DRAWINGS

FIGS. 3A and 3B are exemplary diagrammatical representations of the thermal structure of a water body resulting from one exemplary type of conditioning according to the present invention.

FIGS. 4A and 4B are further exemplary diagrammatical representations of the thermal structure of a water body resulting from another exemplary type of conditioning according to the present invention.

DESCRIPTION OF THE PREFERRED EMBODIMENT

Figure 1:
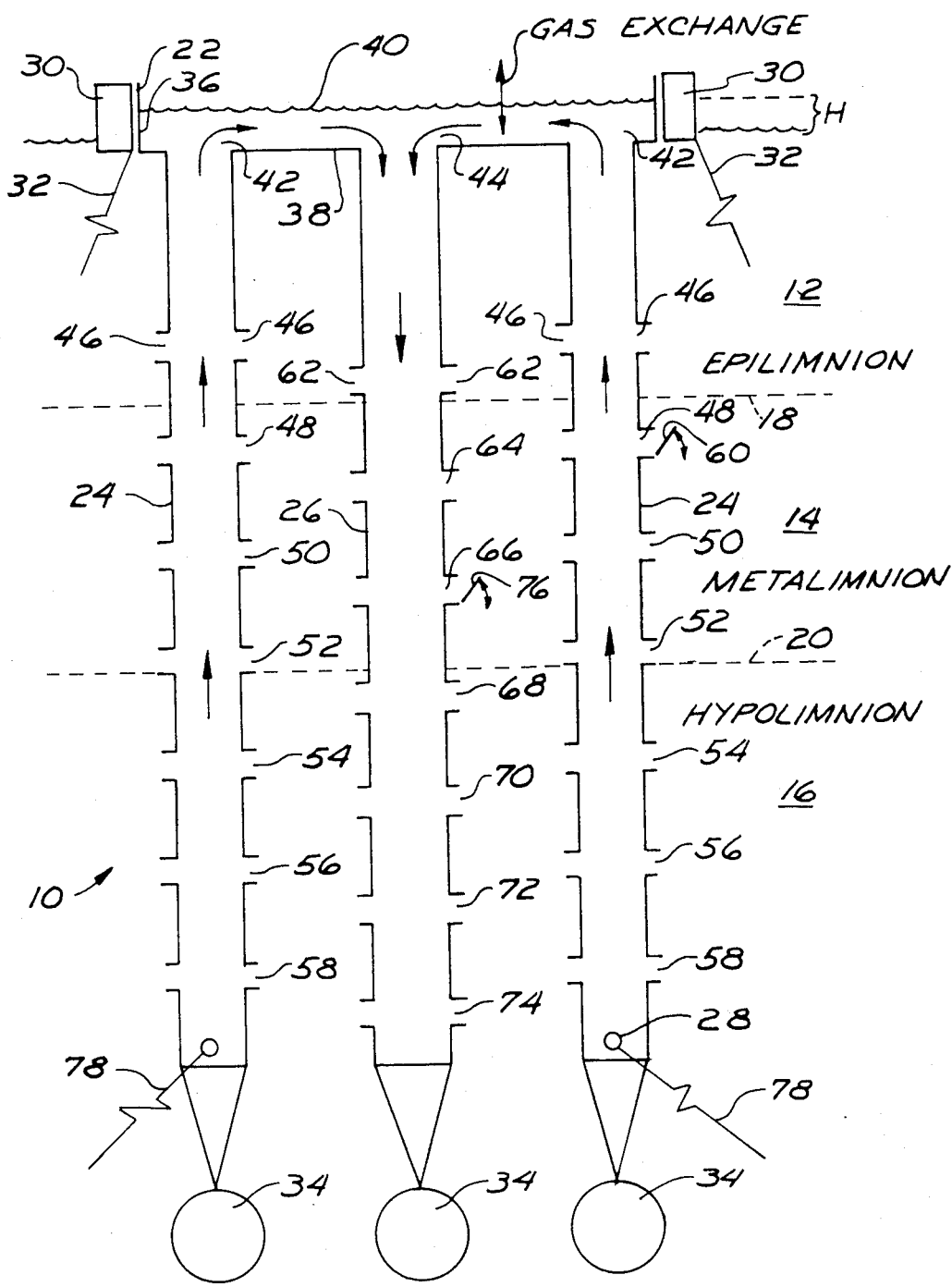
FIG. 1 is a diagrammatical schematic view of the conditioning apparatus of the present invention.

Although specific forms of the invention have been selected for illustration in the drawings, and the following description is drawn in specific terms for the purpose of describing these forms of the invention, this description is not intended to limit the scope of the invention which is defined in the appended claims.

Referring to the drawings wherein the same numerals are utilized to identify the same or similar parts in the several embodiments, the circulator conditioner apparatus of the present invention is generally designated by the numeral 10 and is shown in FIG. 1 operationally assembled within a stratified water body. As indicated, for purposes of explanation, the water body is horizontally divided into the epilimnion layer 12, the metalimnion layer 14 and the hypolimnion layer 16. The broken line 18 generally indicates the boundary between the epilimnion layer and the metalimnion layer and the broken line 20 generally indicates the boundary between the metalimnion layer and the hypolimnion layer.

The circulator apparatus 10 generally comprises a reservoir housing 22, one or more upwelling towers or conduits such as conduits 24, one or more return towers or conduits such as conduit 26 and an air diffuser system designated by the numeral 28. In the embodiment of FIG. 1 a floatation assembly 30 is shown as supporting the reservoir housing 22 at the top surface of the water body, the assembly being secured by mooring lines 32 attached to anchors or the like (not shown) to anchor the reservoir housing 22 in a fixed position in the water body. Weights 34 are secured to the lower ends of the conduits 24, 26 to maintain the conduits in a generally vertical disposition. The flotation assembly 30 may also include means for regulating the buoyancy so as to permit the reservoir housing 22 to be lowered below the water surface when the system is not in operation to protect the system against ice damage and the like.

The reservoir housing 22 has a side wall 36 and a bottom wall 38 which form a container or chamber 40 for containing water at the upper surface of the water body to effect the mixing of waters selectively drawn from preselected depths. The chamber 40 is open to the atmosphere so as to define a liquid-gas interface to permit gas exchange and oxygenation of the water within the chamber 40.

The upwelling towers 24 are connected to the bottom wall 38 of the reservoir housing so that water flowing from the discharge end 42 of the upwelling towers 24 flows into the bottom of the chamber 40 as indicated by the flow arrows in FIG. 1. Each upwelling tower 24 has a plurality of intake ports 46–58 longitudinally spaced along the tower 24 to permit fluid communication with various preselected depth levels of the water body. The inlet port 46 is positioned for fluid communication with the lower portion of the epilimnion layer. The inlet ports 48, 50, 52 are positioned for fluid communication with the upper portion, middle portion, and lower portion, respectively, of the metalimnion layer. The intake ports 54, 56 and 58 are positioned for fluid communication with the upper portion, middle portion, and lower portion, respectively, of the hypolimnion layer. A gate assembly 60 (only one of which is shown) is mounted at each of the intake ports 46–58 for selective opening or closing off the respective intake ports to permit selective fluid intake from one or more of the predetermined depth levels of the water body.

Similarly, the return tower 26 has an inlet end 44 fluidly connected to the bottom of the chamber 40 and a plurality of discharge ports 62–74 longitudinally spaced along the return tower to permit fluid communication with various preselected depth levels of the water body. However, as shown, the discharge ports 62–74 are preferably positioned intermediate the levels of intake ports 46–58. The discharge port 62 is positioned for fluid communication with the lower portion of the epilimnion layer. The discharge ports 64, 66 are positioned generally for fluid communication with the upper and lower mid-regions respectively of the metalimnion layer. The discharge port 68 is positioned for fluid communication with the uppermost region of the hypolimnion level. The remaining discharge ports 70, 72, 74 are positioned progressively deeper in the hypolimnion layer. Each discharge port has a gate assembly 76 (only one of which is shown) for selective opening or closing off the respective discharge ports. Consequently, the depth level of the discharge of water from the return tower 26 into the water body can be preselected to any one or more of the predetermined depth levels of the water body.

While a gate assembly is utilized in the illustrated embodiment for selectively alternately opening and closing off the intake and discharge ports of the upwelling and return towers, other acceptable valves and flow control devices may be utilized. Furthermore, the means for opening and closing off the ports may be manually, mechanically or electrically actuated and the number and longitudinal spacing of the respective ports may be varied to accommodate the particular characteristics of the water body.

An air diffuser system 28 is mounted within the lower end of each of the upwelling towers 24 to introduce pressurized gas, i.e., pressurized air or oxygen, into the upwelling towers. The air defuser systsem 28 is connected by a supply line 78 to a source of pressurized air. The introduction of pressurized air produces an air lift pumping action that propels water upwardly through the upwelling tower into the chamber 40. The flow of the water from the upwelling towers into the chamber 40 causes a corresponding inflow of water through the selected open intake ports from the respective depth levels of the water body. For example, if intake ports 46–56 are closed and intake port 58 is open, the water flowing into the chamber 40 will be drawn from the lowermost level of the hypolimnion layer. Consequently, the inflowing water will be relatively cold in temperature and low in oxygen content.

In addition to causing the water to move upwardly, the introduction of pressurized air into the upwelling tower also serves to aerate and oxygenate the water flowing therethrough. The water is further oxygenated by a gas exchange occurring at the gas-liquid interface in the chamber 40 which is facilitated somewhat by the mixing action resulting from the inflow into the chamber 40 from the plurality of upwelling towers 24. As a result, the water flowing therethrough is substantially aerated and oxygenated. Alternately, other acceptable means for moving the water upward through the upwelling towers may be utilized such as mechanical pumping.

In the illustrated embodiment, the air lift pumping action produced by the air diffuser system 28 is sufficient to produce a pressure head H within the chamber 40 to cause a gravity return of the water through the return tower 26. The water flowing downwardly through the return tower 26 is then discharged through the respective open discharge ports into the water body at the preselected levels.

Accordingly, through selective operation of the gate assemblies 60 on the intake ports 46-58, the source depth of the water drawn into the circulator apparatus 10 can be controlled. Similarly, through selective operation of the gate assemblies 76 on the discharge ports 62-74, the depth of the return of the water from the circulator apparatus can be controlled. As can be appreciated, water can be withdrawn from one or more preselected depth levels simultaneously and then mixed, aerated, and/or oxygenated prior to being returned to the water body at one or more preselected depth levels.

Figure 2:
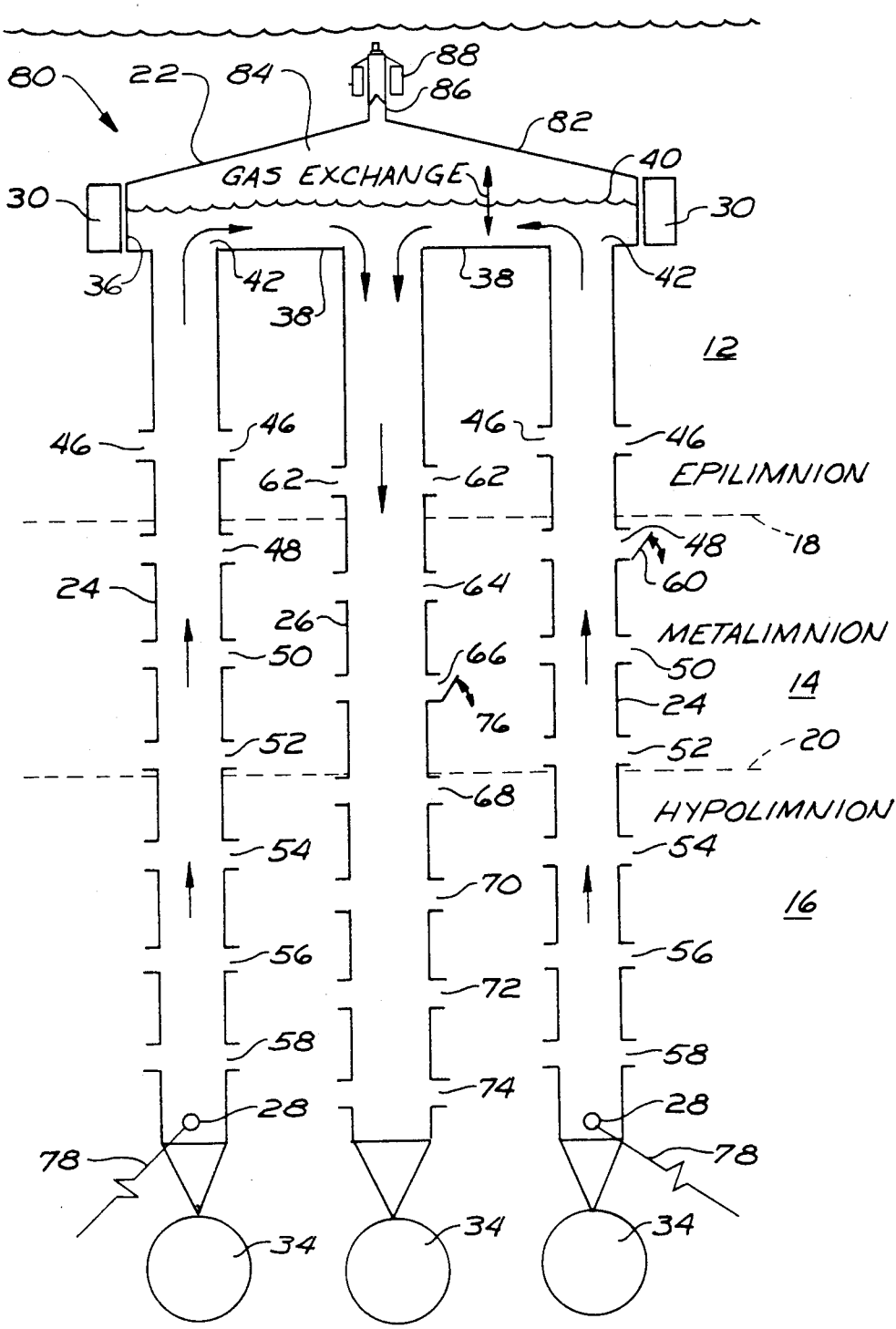
FIG. 2 is another embodiment of the conditioning apparatus of the present invention.

Referring to FIG. 2, an alternate embodiment of the circulator apparatus of the present invention is designated by the numeral 80. The reservoir housing 22 of the circulator apparatus 80 comprises side wall 36, bottom wall 38, and a dome-shaped upper wall 82 that form an enclosed interior mixing/gas exchange chamber 84 adapted for being submerged below the surface of the water body. The upper portion of the chamber 84 contains gas, i.e., air or oxygen, to provide a gas-liquid interface for gas exchange within the chamber 84. A pressure relief assembly 86 is positioned at the apex of the dome-shaped upper wall 82 for controlled release of gas build up within the chamber 84 as a result of the gas exchange from the water circulated through the circulator apparatus 80. A floatation assembly 88 maintains the pressure relief assembly 86 in a vertical position. Alternately, a vent pipe may be extended downwardly into the reservoir housing to limit the volume of the trapped gas space.

The floatation assembly 30 and the gas volume in the chamber 84 in conjunction with the weights 34 maintain the reservoir housing 22 in a submerged position with the upwelling and return towers extending vertically downwardly therefrom. Similar to the embodiment of FIG. 1, the circulator apparatus 80 is selectively operated to condition the water body as desired. Being submerged, the circulator apparatus 80 does not interfere with the aesthetics of the lake surface and is protected somewhat from the direct effects of wind, ice and the like.

With both illustrated embodiments of the circulator apparatus of the present invention, water can be withdrawn from one or more preselected depth levels simultaneously and then mixed, aerated, and/or oxygenated prior to being returned to the water body at one or more preselected depth levels. As a result, the inherent thermal structure and metabolic/oxygen characteristics of the lake water at the various depths in the epilimnion, metalimnion, and hypolimnion layers can be manipulated to attain a desired beneficial result. As can be appreciated, many different configurations of isothermal layers, multiple thermoclines, and mixing/redistributing of available dissolved oxygen can be accomplished by the circulator apparatus. The preferred operational configuration of the circulator apparatus is a function of the individual water body, its thermal structure, morphometric configuration, metabolic behavior and the objectives of treatment. The following two operational configurations are merely exemplary of the operation and possible applications of the present invention.

Operational Example 1 concerns the induction of an isothermal layer, two strong thermoclines, and the redistribution of available dissolved oxygen in the middle depth zone of a water body utilizing the circulator apparatus of the present invention. Specifically, the gate assemblies for the intake ports 46 and 54 of the upwelling towers 24 are set to an open position while the remaining intake ports are closed. In the return tower 26, the gate assembly 76 for the discharge port 66 is set at an open position and the remaining discharge ports are closed. Accordingly, a fraction of the total upwelled water is taken from above and below the natural metalimnion layer in order to create an oxygenated cool isothermal layer at the selected return depth in the lower half of the natural metalimnion layer. The relative amounts of water upwelled from the shallower and deeper locations is determined by the desired temperature and oxygen content of the induced isothermal layer. For example, if 25 percent of the upwelled water comes from a shallower depth at 20° C. containing 10 ppm of dissolved oxygen and 75 percent of the upwelled water is from a depth at 10° C. containing 2 ppm dissolved oxygen, an isothermal layer will be induced following mixing and return at 12.5° and will contain 4 ppm of dissolved oxygen.

Referring to FIG. 3A, the temperature structure including the induced isothermal layer resulting from this operational configuration is shown with the boundary lines 18, 20 being shown as they existed prior to conditioning for purposes of explanation and comparison. Because water immediately above and below the induced isothermal layer shown in FIG. 3A will be considerably warmer and colder, respectively, two steep temperature/density boundaries will be created, i.e., two thermoclines. FIG. 3B diagrammatically indicates the two induced thermoclines in terms of the Relative Thermal Resistance to Mixing (RTRM) standard. The RTRM is computed by converting water temperature to density and comparing density differences between adjacent one meter depth increments relative to the density difference of water at 4° C. and 5° C. Consequently, the RTRM is an indicator of the intensity of density differences in a water column and the depth of maximum RTRM identifies the plane of maximum change in density with depth, or thermocline. In this operational Example, the two strong induced thermoclines are indicated by the depth of the maximum RTRM.

As a result of the induced isothermal layer and two thermoclines induced by the operational configuration of Example 1, the cold water fishery habitat of the lake will be greatly expanded and the in-lake epilimnetic nutrient loading and algal growth will be reduced. Also, a high water quality layer will be provided for water supply withdrawal from the lake.

In operational Example 2, the circulator apparatus is configured to produce the induction of two isothermal oxygenated layers and three depths of steep temperature/density gradient (thermoclines). In this configuration, the intake ports 48 and 52 of the upwelling towers 24 are open and remaining intake ports are closed. In the return tower 26, the discharge ports 64 and 68 are opened while the remaining discharge ports are closed. The intake depths have been selected to create an isothermal layer at the mean temperature of tributary inflow above a colder oxygen-rich induced isothermal layer. The two induced isothermal layers are diagrammatically indicated in FIG. 4A while the three induced thermoclines are diagrammatically indicated in FIG. 4B. In this example, the interflow of tributary water places watershed nutrient and oxygen loads below the highest depth of steep temperature/density gradient (thermocline), thus reducing epilimnetic algal growth due to watershed nutrient input. A deeper, cold oxygenated isothermal layer is created in order to provide expanded cold water fishery habitat and a barrier to upward transport of in-lake generated nutrients and bottom generated constituents.

In the method of conditioning a water body such as that described in operational Examples 1 and 2, the isothermal temperature may be computed based on the heat budget and mixing ratios of the upwelled water. The oxygen content of the isothermal layer may be computed based on the oxygen content, metabolic demand, and the predetermined mixing ratios of the upwelled water. The oxygen input by the air-lift pump system 28 is supplemental to the redistribution of dissolved oxygen available at the selected depth levels.

Accordingly, an apparatus and method for conditioning water bodies to alleviate water quality problems caused by deleterious accumulations is provided. The method and apparatus permit manipulating or altering the thermal structure and metabolic/oxygen status of the water body to maintain or improve water quality such as by creating or inducing new oxygenated isothermal layers and thermoclines at preselected various depths in the water body.

As will be apparent to persons skilled in the art, various modifications and adaptations of the apparatus and method above described will become readily apparent without departure from the spirit and scope of the invention, the scope of which is defined in the appended claims.

I claim:

1. Apparatus for conditioning stratified water bodies having epilimnion, metalimnion and hypolimnion layers comprising
   at least one upwelling and one return conduit adapted for generally vertical disposition within all of said layers of the water body,
   reservoir fluidly connected to the upper ends of both said upwelling and return conduits for transfer of water therebetween, said upwelling conduit having a plurality of intake ports longitudinally spaced along the conduit for fluidly connecting the upwelling conduit to a plurality of said layers in the water body, said intake ports being spaced so as to afford fluid communication with predetermined depth levels of the epilimnion, metalimnion and hypolimnion layers of a water body,
   means for selectively alternately opening and closing off said intake ports of said upwelling conduit to permit selective fluid communication with said predetermined depth levels,
   said return conduit having a plurality of discharge ports longitudinally spaced along said conduit for fluidly connecting the return conduit to a plurality of said layers in the water body, said discharge ports being spaced so as to afford fluid communication with predetermined depth levels of the epilimnion, metalimnion, and hypolimnion layers of a water body,
   means for selectively alternately opening and closing off said discharge ports of said return conduit to permit selective fluid communication with said predetermined depth levels, and
   means for moving water from the water body through the open inlet ports of the upwelling conduit to the open discharge ports of the return conduit via the reservoir to condition the water body.

2. The device of claim 1 wherein said means for selectively alternately opening and closing off said intake ports of said upwelling conduit comprise a gate means at each said intake port for selectively alternately opening and closing off the respective intake port.

3. The device of claim 1 wherein said means for selectively alternately opening closing off said discharge ports of said return conduit comprise a gate means at each said discharge port for selectively alternately opening and closing off the respective discharge port.

4. The device of claim 1 wherein a plurality of intake ports are longitudinally positioned along said upwelling conduit for fluid connection to predetermined depth levels within at least the same one of said layers of the water body.

5. The device of claim 1 comprising a plurality of upwelling conduits with each said upwelling conduit being adapted for generally vertical disposition within the water body and having an upper discharge end fluidly connected to said reservoir means and a plurality of longitudinally spaced intake ports fluidly connecting the upwelling conduit to all the layers of the water body.

6. The device of claim 1 wherein said means for moving water comprises means for introducing pressurized gas into said upwelling conduit to provide a gas lift pumping action within said upwelling conduit.

7. The device of claim 1 wherein said reservoir comprises a submersible housing forming an enclosed interior chamber having an upper portion for containing gas and a lower portion for containing water so as to define a gaseous-liquid interface, said lower portion being connected to said upper discharge end of said upwelling conduit and said inlet end of said return conduit.

8. The device of claim 1 wherein said reservoir comprises a housing for containing liquid and being adapted for floating at the surface of the water body, said housing having a lower portion connected to said upper discharge end of said upwelling conduit and said inlet end of said return conduit.

9. The device of claim 8 which comprises floatation means for positioning said housing at the surface of the water body with said upwelling and return conduits extending generally vertically below said housing and said means for moving water comprises means for introducing pressurized gas into the lower end of said upwelling conduit to propel by gas lift action a column of water upwardly through said upwelling conduit to said housing so as to create a pressure head within said housing for the gravity return of water downwardly through said return conduit.

10. The device of claim 8 which comprises flotation means for positioning said housing at the surface of the water body in an operational position with said upwelling and return conduits extending generally vertically below said housing, said flotation means having means for regulating buoyancy for alternately lowering said housing below the water surface in a nonoperational position.

11. A method of manipulating the thermal/density structure and oxygen content of a thermally stratified body of water having epilimnion, metalimnion and hypolimnion layers with a water circulating apparatus have upwelling and return conduits extending through said layers comprising the steps of selectively drawing water from at least one of any of said layers through said upwelling conduit and forming at least one new induced isotherm at a selected depth within said layers by controllably injecting the drawn water from said return conduit into said water body at said selected depth to form a barrier to upward diffusive transport of nutrients.

12. The method of claim 11 wherein the step of selectively drawing water includes drawing water from at least a pair of remote depth levels of said water body, mixing said remotely drawn water and controllably injecting said mixed water into said water body at said selected depth.

13. The method of claim 12 wherein a second induced isotherm is formed at a second depth remote from said selected depth within said layers by controllably injecting a portion of the mixed water into said water body at said second depth.

14. The method of claim 11 comprising forming a second induced isotherm at a second depth within said layers remote from said selected depth by controllably injecting a portion of the drawn water into said water body at said second depth.

15. The method of claim 11 comprising aerating the drawn water prior to injecting the drawn water into said water body.

16. A method of selectively conditioning a thermally stratified lake of the type having an epilimnion layer, a metalimnion layer and a hypolimnion layer comprising
 selecting a first depth level of the lake in accordance with the physical characteristics of the lake water at said first depth level,
 selecting a second depth level of the lake in accordance with the physical characteristics of the lake water at said second depth level,
 withdrawing water from said first and second depth levels in a predetermined ratio,
 mixing said water from said first and second depth levels,
 conducting water from said first and second depth levels in the predetermined ratio to at least a preselected depth level in the lake to condition the lake.

17. The method according to claim 16 for inducing a preselected isothermal layer at a preselected depth in a lake which comprises
 determining the required water temperature for forming said isothermal layer at said preselected depth,
 selecting a first depth level of the lake which exhibits a first predetermined water temperature,
 selecting a second depth level of the lake which exhibits a second predetermined water temperature wherein a mixture of a predetermined ratio of water from said first and second depth levels produces said required water temperature for inducing said isothermal layer at said preselected depth, and
 conducting water from said first and second depth levels in the predetermined ratio to said preselected depth to form said isothermal layer thereat.

18. The method according to claim 17 for also inducing a second isothermal layer at a second preselected depth in a lake comprising conducting water from said first and second depth levels in the predetermined ratio to said second preselected depth to form said second isothermal layer.

19. The method according to claim 16 for inducing a thermocline at a preselected depth in a lake which comprises
 determining the required water temperature for forming said thermocline at a first preselected depth,
 selecting a first depth level of the lake which exhibits a first predetermined water temperature,
 selecting a second depth level of the lake which exhibits a second predetermined water temperature wherein a mixture of a predetermined ratio of water from said first and second depth levels produces said required water temperature for inducing said thermocline at said first preselected depth, and
 conducting water from said first and second depth levels in the predetermined ratios to a second preselected depth so as to form said thermocline at said first preselected depth.

20. The method of claim 19 which includes forming a second thermocline at a third preselected depth.

21. The method of claim 20 which comprises conducting water from said first and second depth levels in the predetermined ratio to a fourth preselected depth to form a third thermocline at a fifth preselected depth.

22. The method of claim 16 which comprises oxygenating and aerating the water from said first and second depth levels prior to conducting said water to said third preselected depth level in the lake.

23. The method of claim 16 wherein said mixing and said conducting of said water from said first and second depth levels occur substantially simultaneously.

24. A method according to claim 16 for expanding cold water fishery habitat of a lake and reducing in-lake epilimnetic nutrient algal growth comprising
 withdrawing water from the lower portion of the epilimnion layer and the upper portion of the hypolimnion layer in a predetermined ratio,
 mixing the withdrawn water, and
 conducting the water to the lower portion of the metalimnion layer so as to form an induced isothermal layer in said metalimnion layer with a first induced substantially steep thermocline above said induced isothermal layer and a second induced substantially steep thermocline below said induced isothermal layer.

25. A method according to claim 16 for reducing epilimnetic algal growth, creating a barrier to upward transport of in-lake generated nutrients and bottom generated constituents, and expanding cold water fishery habitat in a lake comprising
 withdrawing water from the upper portion of the metalimnion layer and from the lower portion of the metalimnion layer in a predetermined ratio,
 mixing the withdrawn water, and
 conducting the water to the middle portion of the metalimnion layer and to the upper portion of the hypolimnion layer so as to form upper and lower induced isothermal layers substantially in said metalimnion layer with a first induced thermocline above said upper isothermal layer, a second induced thermocline between said upper and lower induced isothermal layers and a third induced thermocline below said lower induced isothermal layer.

* * * * *